United States Patent
Sundberg

(10) Patent No.: US 7,460,856 B2
(45) Date of Patent: Dec. 2, 2008

(54) METHOD AND APPARATUS FOR SWITCHING ACCESS BETWEEN MOBILE NETWORKS

(75) Inventor: Per-Erik Sundberg, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 545 days.

(21) Appl. No.: 10/499,697

(22) PCT Filed: Dec. 18, 2002

(86) PCT No.: PCT/SE02/02379

§ 371 (c)(1),
(2), (4) Date: Jun. 21, 2004

(87) PCT Pub. No.: WO03/055261

PCT Pub. Date: Jul. 3, 2003

(65) Prior Publication Data

US 2005/0013264 A1    Jan. 20, 2005

(30) Foreign Application Priority Data

Dec. 20, 2001    (SE) .................................... 0104325

(51) Int. Cl.
*H04M 3/16*    (2006.01)

(52) U.S. Cl. .................... 455/411; 455/440; 455/444; 455/448; 455/456.1; 455/552.1

(58) Field of Classification Search ............... 455/411, 455/440, 444, 448, 456.1, 552.1, 553.1; 370/331
See application file for complete search history.

(56) References Cited

U.S. PATENT DOCUMENTS

| | | | | |
|---|---|---|---|---|
| 5,825,759 A * | 10/1998 | Liu | ........................... | 370/331 |
| 6,243,581 B1 * | 6/2001 | Jawanda | .................. | 455/432.2 |
| 6,326,926 B1 * | 12/2001 | Shoobridge et al. | ......... | 343/702 |
| 6,529,491 B1 * | 3/2003 | Chang et al. | ................ | 370/335 |
| 6,888,811 B2 * | 5/2005 | Eaton et al. | ................. | 370/338 |
| 7,171,216 B1 * | 1/2007 | Choksi | ................... | 455/456.1 |
| 2002/0147008 A1 * | 10/2002 | Kallio | ........................ | 455/426 |
| 2003/0157926 A1 * | 8/2003 | Ala-Laurila et al. | ......... | 455/406 |
| 2004/0068571 A1 * | 4/2004 | Ahmavaara | ................. | 709/228 |
| 2006/0291455 A1 * | 12/2006 | Katz et al. | ................... | 370/355 |

FOREIGN PATENT DOCUMENTS

| | | |
|---|---|---|
| WO | 0041427 | 7/2000 |
| WO | WO01/35585 | 5/2001 |
| WO | 0158177 | 8/2001 |
| WO | 0158190 | 8/2001 |
| WO | 02030132 | 4/2002 |

* cited by examiner

*Primary Examiner*—Duc Nguyen
*Assistant Examiner*—Julio R Perez
(74) *Attorney, Agent, or Firm*—Nixon & Vanderhye P.C.

(57) ABSTRACT

A method and apparatus for switching access between mobile networks for a mobile terminal comprising a first and a second radio device capable of communication with a first and a second mobile network, respectively. The second mobile network has priority over the first mobile network. A first connection is authorised and established between the first radio device and the first mobile network. When it is detected that the mobile terminal moves into a coverage area of the second mobile network, a second connection is authorised and established between the second radio device and the second mobile network based on the authorising made for the first connection with the first mobile network. Both connections can then rely on the authorisation of the first connection.

14 Claims, 1 Drawing Sheet

METHOD AND APPARATUS FOR SWITCHING ACCESS BETWEEN MOBILE NETWORKS

This application is the US national phase of international application PCT/SE02/02379 filed 18 Dec. 2002, which designated the US. PCT/SE02/02379 claims priority to SE Application No. 0104325.6 filed 20 Dec. 2001. The entire contents of these applications are incorporated herein by reference.

TECHNICAL FIELD

The present invention relates generally to a method and apparatus for switching access for a mobile terminal between overlapping mobile networks. In particular, the handover procedure between mobile networks is facilitated.

BACKGROUND OF THE INVENTION AND PRIOR ART

Mobile access networks are often designed as cellular networks including a plurality of base stations being connected together by means of switching nodes such as Base Station Controllers (BSCs) and/or Mobile Switching Centres (MSCs). Each base station provides radio coverage over an area known as a cell, for communication over radio channels with mobile terminals located in the cell. When a communicating mobile terminal moves across a cell border, its radio connection switches between the corresponding base stations by means of a "handover" or "handoff" procedure. Each mobile network operator is allocated a certain limited radio frequency spectrum for transmissions, and efforts are made by network designers to provide a high traffic capacity within the allocated spectrum.

When setting up radio connections with mobile terminals, standardised communication protocols and radio channels are used, such as those defined for GSM, TDMA, PDC, UMTS, etc, for transmission of speech and/or data over the air interface as well as within the network, providing a certain data rate. Digital circuit switched radio channels of today, e.g., according to the GSM standard, are primarily designed for communication of encoded speech, providing data rates of less than 10 kbit/s.

Existing GSM networks are currently being extended with packet based GPRS (General Packet Radio Service) technology, providing packet switched radio communication with enhanced data rates ranging between 10 and 120 kbit/s for mobile terminals having GPRS capabilities. Further switching nodes, such as Gateway GPRS Service Nodes (GGSNs) and Serving GPRS Service Nodes (SGSNs), are included in GPRS networks. GSM/GPRS networks and other cellular networks typically provide radio coverage over large areas, often covering entire countries, more or less.

Currently, enhanced wireless access technologies are emerging having far greater data rates, such as WLAN (Wireless Local Area Network), covering much smaller areas and providing so-called "spot coverage" over distances around 100 meters. WLAN stands for a plurality of high-speed wireless technologies, e.g., employing frequency hopping and spread-spectrum radio technologies not further discussed here, for packet based radio communication with data rates ranging between approximately 2-54 Mbit/s. Radio channels are used in freely available frequency bands, such as 2,4 GHz and beyond, requiring no operator licence.

A WLAN may use one or more radio stations as access points to which mobile terminals having WLAN capabilities may be connected over predefined radio channels. A WLAN radio station may be directly connected to a extension of a fixed LAN (Local Area Network) which in turn, through various gateways and/or routers, may provide access to the global Internet or to a company intranet. In the case of Internet, a service is normally utilised from a public telecommunication operator.

WLAN typically provides a limited spot coverage geographically overlapping the larger coverage of cellular networks, such as GSM/GPRS networks. The cellular networks can offer connectivity in urban areas as well as in rural areas, whereas WLAN can offer high speed connections in small hot spot areas. WLAN for public access is currently used mainly in airports, hotels and conference venues, providing fast Internet access and other data services to visitors.

Today, work is in progress for developing a multitude of new mobile services, which will be possible to employ in particular as new technologies with greater capacity and higher data rates are introduced. The contents of the new services include voice, text, images, audio files and video files in various different formats and combinations. Internet browsing is also becoming very popular, and in recent years, the wireless and Internet domains are converging.

More sophisticated mobile terminals are also becoming available on the market, provided with functionality matching the new services. Furthermore, it is possible to combine different mobile terminals. For example, a portable laptop computer may be connected to a mobile phone by means of a cable or a wireless interface, such as a Bluetooth radio interface. The mobile phone can then be used as a radio unit providing access over a cellular network, such as a GSM/GPRS network, and the laptop is utilised as an enhanced user interface, whereas the mobile phone acts as a "modem". Laptop computers may also be provided with a radio device, e.g., implemented as a PCCARD or the like, for radio access to a WLAN. Alternatively, plural radio devices may be integrated in a single terminal, e.g., a laptop computer, for radio communication with different networks, such as a WLAN and a GSM/GPRS network.

For users having a mobile terminal equipment capable of radio communication over multiple access networks, either as a single integrated device or as plural interconnected devices, it is desirable that the mobile terminal is automatically connected to the access network providing the highest data rates, if more than one network is currently available. The user will then benefit from the best available communication possibilities in any given location. For example, a user having a laptop with WLAN capabilities interconnected with a mobile phone with GSM/GPRS capabilities, will want to switch access to a WLAN when entering its coverage area, instead of being connected to the more limited GSM/GPRS network.

In applicant's own PCT application WO 01/35585, it is described a mechanism for selecting the "best" and optimal network connection, when more than one network is available to one or more end devices. The selection is made with respect to factors such as available bandwidth, charge rate, quality, individual preferences, etc.

An access switch between two networks requires that a new radio connection is established with the new network, involving the creation of a new communication session context. The present invention aims at facilitating the switching of access between different networks with maintained security.

Creating a communication session context includes performing certain pre-defined routines for authentication, authorisation and accounting, sometimes referred to as AAA for short. Cellular networks employ AAA routines according to their standardised communication protocols, which are regarded as having a fairly high level of security. For example, each mobile phone may be provided with a secret identity code or the like which is known in the network and is used for authentication and/or for generating encryption keys. The identity code may be stored in a smart card, such as a SIM (Subscriber Identity Module) card as used in GSM, which is movable between different terminals.

A WLAN connection may be secured by means of a certificate stored in the terminal, which is regarded as trustworthy and is used to verify the identity of the user or subscriber. The certificate may also be used for generating various encryption keys and/or session keys to authenticate the terminal and to protect an ongoing session according to well-known techniques, which will not be described here further. The certificate may be issued by a certification authority and may comprise one or more secret codes. However, such secret codes, certificates and encryption keys are cumbersome to administrate and distribute, in particular to subscribers of the general public.

In addition to using stored codes and certificates in the terminal, some services, e.g., Internet services, require a login procedure involving a shared secret, normally a user ID/password combination.

In present solutions, when a mobile terminal with multiple capabilities switches from a first network to a second network, it is a problem that the session context of the first connection is lost and a new session context must be established with the second network, involving a new authentication procedure, among other things. This is the case when, for example, switching between a GSM/GPRS network and a WLAN in either direction. The new session context may further determine different user interface features, available services and charge rates, as dictated by the second network.

Establishing a session context is a fairly complex procedure, and if two different networks are to be accessed, two separate authentication mechanisms having a certain level of security are required, each involving the distribution and storing of secret codes and/or certificates. Further, both networks need one or more nodes with protected links for performing authentication routines.

It is desirable to reduce the handling of shared secrets between a subscriber and network operators, at the same time maintaining security. It is also desirable that the amount of exchanged information and processing work are minimised when switching between networks for reducing the load on transmission resources and to reduce delays.

SUMMARY OF THE INVENTION

The object of this invention is to reduce or eliminate the problems outlined above. This object and others are obtained by providing a method and apparatus for switching access for a mobile terminal between mobile networks. The mobile terminal comprises a first radio device capable of communication with a first mobile network and a second radio device capable of communication with a second mobile network. The second mobile network has priority over the first mobile network, for example by offering a higher transmission bitrate, a higher quality and/or enhanced services.

According to the inventive method, an access request is made to the first mobile network by the mobile terminal using the first radio device. A first connection is authorised and established between the first radio device and the first mobile network. Payload data may then be communicated over the first connection with the limited bitrate/quality/services as offered by the first mobile network. Later, it is detected that the mobile terminal moves into a coverage area of the second mobile network. A second connection is then authorised and established between the second radio device and the second mobile network based on the authorising made for the first connection with the first mobile network.

When authorising the second connection, authentication information is exchanged between the first radio device and an authentication unit in the first mobile network, which authentication information is used by the second radio device for accessing the second mobile network. In this way, authorisation of the second connection relies on the authorisation made for the first connection, thereby substantially facilitating the access switch from the first to the second network. The security level of the first network is also maintained and utilised for the second mobile network.

The exchanged authentication information may comprise login information and one or more encryption keys, according to a predetermined authentication agreement between the first and second mobile networks. Payload data communicated between the second radio device and the second mobile network in the second connection may then be protected by the one or more exchanged encryption keys.

The present invention further embraces a mobile terminal comprising a first radio device capable of communication with a first mobile network and a second radio device capable of communication with a second mobile network, wherein the second mobile network has priority over the first mobile network. The first radio device includes means for making an access request to the first mobile network and means for authorising and establishing a first connection between the first radio device and the first mobile network. The first radio device further includes means for authorising a second connection between the second radio device and the second mobile network based on the first authorised connection with the first mobile network, when it is detected that the mobile terminal moves into a coverage area of the second mobile network.

The present invention further embraces an authentication unit for authenticating a mobile terminal comprising a first radio device capable of communication with a first mobile network and a second radio device capable of communication with a second mobile network, wherein the second mobile network has priority over the first mobile network. The authentication unit includes means for authorising and establishing a first connection between the first radio device and the first mobile network in response to an access request from the first radio device. The authentication unit further includes means for exchanging authentication information with the first radio device when it is detected that the mobile terminal moves into a coverage area of the second mobile network, wherein the exchanged authentication information is used by the second radio device for accessing the second mobile network.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
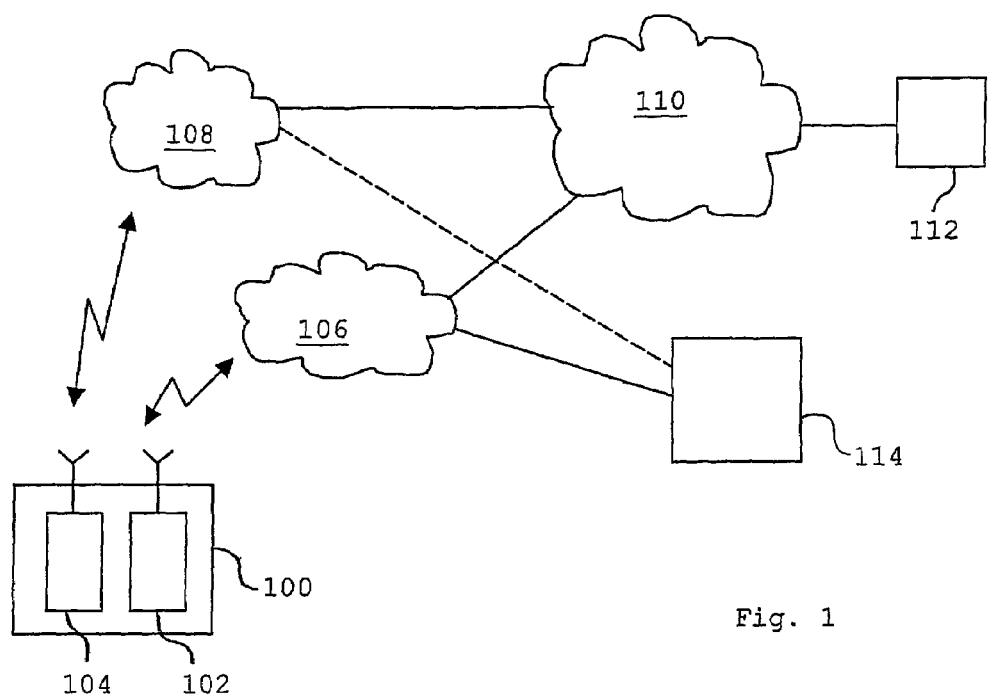
FIG. 1 is a schematic view of a communication scenario in which the invention may be implemented.

FIG. 1 is a schematic view of an exemplary communication scenario in which the present invention may be implemented. 100 denotes a mobile terminal equipment generally comprising a first radio device 102 and a second radio device 104 for communication with first and second mobile access networks 106 and 108, respectively. By way of example, the first radio device 102 may be a mobile phone for radio communication with a cellular network 106, and the second radio device 104 may be a laptop computer equipped with a PCCARD or the like for radio communication with a WLAN 108. The mobile phone 102 and the laptop 104 are interconnected by means of a communication link, such as a cable, a Bluetooth interface or an infrared link. The functionality of both the mobile phone 102 and the laptop 104 may therefore be used, regardless of which network is connected.

It should be understood that the mobile terminal 100 is only logically represented in FIG. 1 as two radio devices 102, 104, but can be designed in many alternative ways within the scope of the present invention. For example, the mobile terminal 100 may instead be one integrated unit, such as a single laptop with a PCCARD or a single mobile phone, either being capable of radio communication with both networks 106 and 108.

Both networks 106, 108 are further connected to a backbone network 110, which may be the Internet, an intranet, a fixed public or private network, or any combination of such networks. A server 112 is connected to the backbone network 110, providing service to the mobile terminal 100 in this case.

The first network 106 covers a wide geographic area, and the second network 108 covers a limited overlapping spot area, and can provide a higher data transmission rate than the first network 106. It is therefore preferred that the mobile terminal 100 is connected to the second network 108 when being within the spot coverage area of the second network 108. The second network 108 may also provide a higher quality or enhanced services. Generally speaking, the second network 108 has priority over the first network 106.

The first network 106 comprises an authentication unit 114 having access to various authentication information which is used for authenticating the mobile terminal 100. The authentication information is stored in a database, such as a HLR (Home Location Register), not shown, and may include identity codes and/or certificates matching similar information stored in the terminal or in a SIM card or the like inserted therein.

Figure 2:
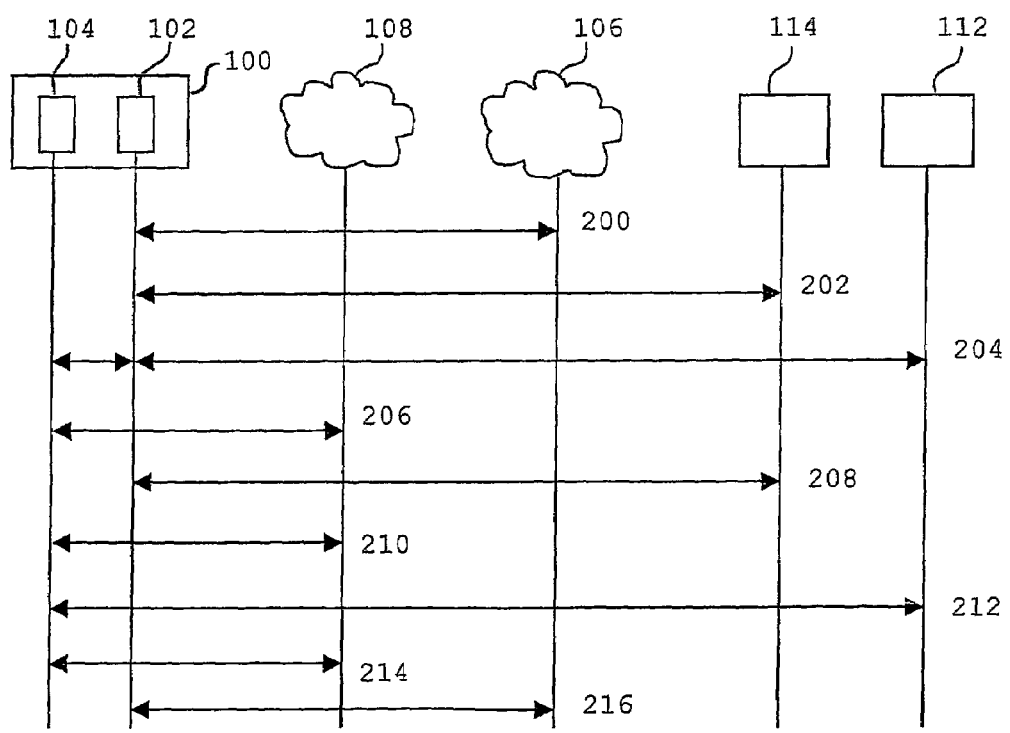
FIG. 2 is a schematic signalling diagram of a procedure for switching between two networks.

An exemplary procedure will now be described for accessing the first network 106 and then switching access to the second network 108, with reference to a signalling diagram in FIG. 2. Corresponding elements are denoted with the same reference numbers as in FIG. 1.

Firstly, the mobile terminal 100 makes access to the first network 106 using the first radio device 102, in a first step 200. When setting up the connection, a session context is established, including an authentication procedure. The session context may further include setting parameters such as user interface features, service features, a charge rate and communication protocols, including a data rate.

The authentication procedure involves exchanging of secret codes and/or certificates between the mobile terminal 100 and the authentication unit 114, in a step 202, according to a routine which is predefined in the first network 106. For example, if the first network 106 is a GSM/GPRS network, a SIM card in a mobile phone is used. Different network types have their own specific predefined authentication procedures as dictated by standardised protocols, which will not be described here further.

When the session context is created and a connection is authorised, the mobile terminal 100 may begin to communicate payload data over the first network 106, in this case with a server 112 providing service to the mobile terminal 100, in a step 204. The data rate is then limited to the bitrate offered by the first network 106. Since the two radio devices 102, 104 are interconnected, the functionality and user interface of both may be used by a user, as described above. For example, an IP (Internet Protocol) connection may be established between a mobile phone 102 and a packet core network, not shown, in the first network 106, which IP connection may be available to a laptop computer connected to the mobile phone 102.

If the mobile terminal 100 moves into the coverage area of the second access network 108, this can be detected automatically in a step 206, preferably by means of the second radio device 104. The presence of the mobile terminal 100 in the coverage area of the second network 108 can in fact be detected in different ways. Three exemplary alternatives are given below:

1. The second network 108 transmits an identification signal which the mobile terminal 100 can detect in the second radio device 104, such as a PCCARD or the like installed in a laptop computer. For example, in a WLAN, access points continuously transmit an identifier, typically named ESSID (Extended Service Set Identifier) and/or SSID, which the second radio device 104 can receive and recognise as identifying the WLAN.
2. The second radio device 104 transmits an identification signal which is detected by the second network 108, which then may notify the radio device 104 accordingly.
3. A locating function determines that the mobile device 100 is located within the second network 108. The locating may be performed by a GPS (Global Location System) unit, or by a function in the first network 106, such as triangulation. Such locating functions are currently used for, e.g., transmitting location dependent messages to mobile terminals and for searching purposes. The GPS unit or the first network 106 may then notify the mobile terminal 100 accordingly.

When the availability of the second network 108 to the mobile terminal 100 has been detected, as described in step 206, a new connection with the second network 108 is authorised, based on the authorising for the connection with the first network 106 made in step 202. The first radio unit 102 and the authentication unit 114 then exchanges information, in a step 208, for authorising and establishing the new connection with the second network 108.

The first radio unit 102 may begin by sending an access request. The authentication unit 114 then replies by sending login information, such as a login identity and a temporary password, which the mobile terminal 100 can use when accessing the second network 108 by means of the second radio unit 104. The authentication unit 114 may also send one or more encryption keys to be used during the login procedure and/or during the communication session. The first network 106 has a predetermined authentication agreement with the second network 108, valid for the mobile terminal 100, including the exchanged login information and encryption keys, which are thus already known in the second network 108.

The second network 108 and the second radio unit 104 then exchanges various messages for establishing a new session context, in a step 210, using the login information and encryption keys obtained in step 208.

In this way, the authentication done with the first network 106 in step 202 is utilised for authorising the new session with the second network 108 in step 210. For example, the second network 108 may comprise a subscriber administration server having the agreed login information and encryption keys stored therein. The subscriber administration server of the second network 108 may be integrated with the authentication unit 114 of the first network 106 in one server common to both networks 106, 108.

Hence, the high level of security offered in the first network 106 is utilised by the second network without requiring its own administration and distribution of secret codes and certificates. The authentication procedure in step 210 is also facilitated by reducing the amount of exchanged information, thereby also reducing delays and transmission load.

When the new session context is established and a connection with the second network 108 is authorised, the mobile terminal 100 may communicate payload data with the server 112 by means of the second radio device 104, in a step 212. In this case, the data rate is then increased to the higher bitrate offered by the second network 106. Further, the communicated payload data may be protected by encryption keys issued by the authentication unit 114 of the first network 106 during step 208. The access switch over to the second network 108 is fully automatic, requiring no efforts from a user.

If the mobile terminal 100 moves out of radio coverage of the second network 108, the connection breaks down in a step 214, and the session automatically reverts to the first network 106 by means of the first radio device 102, in a step 216. Since this connection was already authorised in step 202, no further authentication actions are required.

In practice, the invention may be implemented in a computer program for use in the mobile terminal 100, and in a computer program for use in the authentication unit 114.

By using the described invention, access switching between two networks is facilitated with maintained security, without requiring manual efforts from a user. Also, delays and transmission load are reduced.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of switching access for a mobile terminal between a first mobile network and a second different mobile network, the mobile terminal comprising a first radio device and a second radio device capable of communication with the first and second mobile networks, respectively, wherein the first and second radio devices are interconnected by a communications link and the second mobile network has priority over the first mobile network, the method comprising:
   A) making an access request to the first mobile network by the mobile terminal using the first radio device,
   B) authorizing and establishing a first connection between the first radio device in the mobile terminal and the first mobile network,
   C) when the mobile terminal is detected as present in a coverage area of the second mobile network, the first radio device of the mobile terminal receiving authentication information from an authentication unit in the first mobile network, wherein the received authentication information includes one or more encryption keys and log-in information from the authentication unit, and
   D) authorizing and establishing a second connection between the second radio device in the mobile terminal and the second mobile network based on the authorizing step B) for the first connection with the first mobile network, wherein the second radio device uses said one or more encryption keys to establish the second connection and to protect payload data communicated over the second connection, and wherein the first mobile network has a predetermined authentication agreement with the second mobile network so that the authentication information and encryption keys are already known in the second network prior to authorizing and establishing the second connection.

2. A method according to claim 1, wherein the mobile terminal presence in the coverage area of the second mobile network is detected by the second radio device detecting an identification signal transmitted by the second mobile network.

3. A method according to claim 1, wherein the mobile terminal presence in the coverage area of the second mobile network is detected by the second mobile network detecting an identification signal transmitted by the second radio device.

4. A method according to claim 1, wherein the mobile terminal presence in the coverage area of the second mobile network is detected by a locating function determining that the mobile terminal is located within the coverage area of the second mobile network.

5. A method according to claim 1, wherein the first radio device is a mobile phone, the first mobile network is a GSM/GPRS network, the second radio device is a PCCARD in a laptop computer being connected to the mobile phone, and the second mobile network is a WLAN.

6. A method according to claim 1, wherein the first mobile network covers a wide geographical area, and the second mobile network covers a limited overlapping spot area.

7. The method according to claim 1, wherein the first mobile network has an authentication agreement with the second mobile network valid for the mobile terminal.

8. Mobile terminal apparatus comprising a first radio device and a second radio device which are capable of communication with a first mobile network and a second different mobile network, respectively, wherein the first and second radio devices are interconnected by a communications link and the second mobile network has priority over the first mobile network, the first radio device in the mobile terminal comprising electronic circuitry configured to:
   make an access request to the first mobile network;
   authorize and establish a first connection between the first radio device in the mobile terminal and the first mobile network;
   when the mobile terminal is detected as present in a coverage area of the second mobile network, receive authentication information with an authentication unit in the first mobile network, wherein the received authentication information includes one or more encryption keys and log-in information from the authentication unit,
   and the second radio device in the mobile terminal comprising electronic circuitry configured to:
   authorize and establish a second connection with the second mobile network by using the authentication information exchanged between the first radio device and the authentication unit in the first mobile network, and
   use said one or more encryption keys to establish the second connection and to protect payload data communicated over the second connection, and wherein the first mobile network has a predetermined authentication agreement with the second mobile network so that the authentication information and encryption keys are already known in the second network prior to authorizing and establishing the second connection.

9. Mobile terminal apparatus according to claim 8, wherein the second radio device electronic circuitry is further configured to detect an identification signal transmitted by the second mobile network.

10. Mobile terminal apparatus according to claim 8, wherein the first radio device is a mobile phone capable of communication with a GSM/GPRS network, and the second radio device is a PCCARD in a laptop computer capable of communication with a WLAN.

11. The mobile terminal apparatus in claim 8, wherein the first mobile network has an authentication agreement with the second mobile network valid for the mobile terminal.

12. An authentication unit for authenticating a mobile terminal comprising a first radio device and a second radio device capable of communication with a first mobile network and a second different mobile network, respectively, wherein the first and second radio devices are interconnected by a communications link, the second mobile network has priority over the first mobile network, and wherein the first mobile network has an authentication agreement with the second mobile network valid for the mobile terminal, the authentication unit comprising electronic circuitry is configured to:

authorize and establishing a first connection between the first radio device in the mobile terminal and the first mobile network in response to an access request from the first radio device, and to exchange authentication information with the first radio device of the mobile terminal when the mobile terminal is detected as present in a coverage area of the second mobile network, wherein the authentication information includes one or more encryption keys and log-in information from the authentication unit, wherein the exchanged authentication information can be used by the second radio device in the mobile terminal for authorizing and establishing a second connection between the second radio device and the second mobile network, wherein said one or more encryption keys can be used by the second radio device to establish the second connection and to protect payload data communicated over the second connection, and wherein the first mobile network has a predetermined authentication agreement with the second mobile network so that the authentication information and encryption keys are already known in the second network prior to authorizing and establishing the second connection.

13. An authentication unit according to claim 12, wherein the authentication unit belongs to the first mobile network.

14. An authentication unit according to claim 13, wherein the authentication unit also belongs to the second mobile network.

* * * * *